US012639456B2

(12) United States Patent
Marino et al.

(10) Patent No.: US 12,639,456 B2
(45) Date of Patent: May 26, 2026

(54) SOFTWARE ENGINE FOR ABSTRACTING SECURITY CONTROLS IN ONE-WAY TRANSFER SYSTEMS

(71) Applicant: Microsoft Technology Licensing, LLC, Redmond, WA (US)

(72) Inventors: Peter Joseph Marino, Seattle, WA (US); Jeffrey Allen West, Woodinville, WA (US); Michael E. Roberson, Vienna, VA (US); Justin Collin Robinson, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 18/326,359

(22) Filed: May 31, 2023

(65) Prior Publication Data

US 2024/0403451 A1　Dec. 5, 2024

(51) Int. Cl.
*G06F 21/60* (2013.01)
*H04L 9/32* (2006.01)
*H04L 9/40* (2022.01)
*H04L 67/06* (2022.01)

(52) U.S. Cl.
CPC .......... *G06F 21/604* (2013.01); *H04L 9/3247* (2013.01); *H04L 63/123* (2013.01); *H04L 63/20* (2013.01); *H04L 67/06* (2013.01)

(58) Field of Classification Search
CPC ....... G06F 21/604; H04L 67/06; H04L 63/20; H04L 9/3247; H04L 63/123
See application file for complete search history.

(56) References Cited

U.S. PATENT DOCUMENTS

| | | | | |
|---|---|---|---|---|
| 2014/0337410 A1* | 11/2014 | Mraz | ...................... | H04L 63/20 |
| | | | | 709/203 |
| 2014/0337471 A1* | 11/2014 | Yasuda | ................. | G06F 9/5072 |
| | | | | 709/217 |
| 2021/0377219 A1* | 12/2021 | Finchelstein | ......... | H04L 9/3247 |

(Continued)

FOREIGN PATENT DOCUMENTS

EP　　1596557 A2　11/2005

OTHER PUBLICATIONS

Bertino et al., Specifying and enforcing access control policies for XML document sources, 2000 Published by Baltzer Science Publishers BV pp. 139-151 (Year: 2000).*

(Continued)

*Primary Examiner* — Ellen Tran

(57) ABSTRACT

Examples of the present disclosure describe systems and methods for implementing a software-based security abstraction engine in a one-way transfer (OWT) system. In examples, data is received at a first device in the OWT system. A first set of policies is identified based on a dataflow identifier associated with the transfer of the data. A policy engine associated with the first set of policies applies the first set of policies to the data to create digital signatures. The digital signatures are evaluated by the security abstraction engine to determine whether the set of digital signatures is valid. If the digital signatures are determined to be valid, a second set of policies is applied to the data. The data is then transmitted to a second device or destination in the OWT system based on the dataflow identifier.

20 Claims, 5 Drawing Sheets

(56)     References Cited

U.S. PATENT DOCUMENTS

2023/0161642 A1 *   5/2023   Adogla ................... G06F 9/541
                                                    719/328

OTHER PUBLICATIONS

International Search Report and Written Opinion received for PCT Application No. PCT/US2024/026918, Jun. 26, 2024, 17 pages.
International Preliminary Report on Patentability (Chapter I) received for PCT Application No. PCT/US2024/026918, Dec. 11, 2025, 12 pages.

* cited by examiner

| Transaction ID | Destination ID |
|---|---|
| 1 | Container A |
| 2 | Container B |
| 3 | Queue A |
| 4 | Queue B |

| Transaction ID | Source ID | Policy ID |
|---|---|---|
| 1 | Customer 1 | 0001 |
| 2 | Customer 1 | 0002 |
| 3 | Customer 2 | 0010 |
| 4 | Service Bus 1 | 0025 |

SOFTWARE ENGINE FOR ABSTRACTING SECURITY CONTROLS IN ONE-WAY TRANSFER SYSTEMS

BACKGROUND

Many computing environments implement dedicated hardware components that provide security and policy enforcement for data transfer and data storage activities. In many cases, such hardware components cause a significant negative impact on the scalability of computing environments, due to the expense of the hardware components, the amount of time required to procure the hardware components, and the difficulty of configuring and physically installing the hardware components.

It is with respect to these and other general considerations that the aspects disclosed herein have been made. Also, although relatively specific problems may be described, it should be understood that the examples should not be limited to solving the specific problems identified in the background or elsewhere in this disclosure.

SUMMARY

Examples of the present disclosure describe systems and methods for implementing a software-based security abstraction engine in a one-way transfer (OWT) system. In examples, data to be transferred via an OWT system is received at a first device in the OWT system. A first set of policies to be applied to the data during the data transfer is identified based on a dataflow identifier associated with the data transfer. A policy engine associated with the first set of policies applies the first set of policies to the data to create a set of digital signatures. The set of digital signatures is evaluated by the security abstraction engine to determine whether the set of digital signatures is valid. In response to determining that the set of digital signatures is valid, the security abstraction engine creates a provenance digital signature for the data. The security abstraction engine also applies a second set of policies to the data. After the second set of policies has been applied to the data, the data is transmitted to a second device or destination in the OWT system based on the dataflow identifier.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Figure 1:
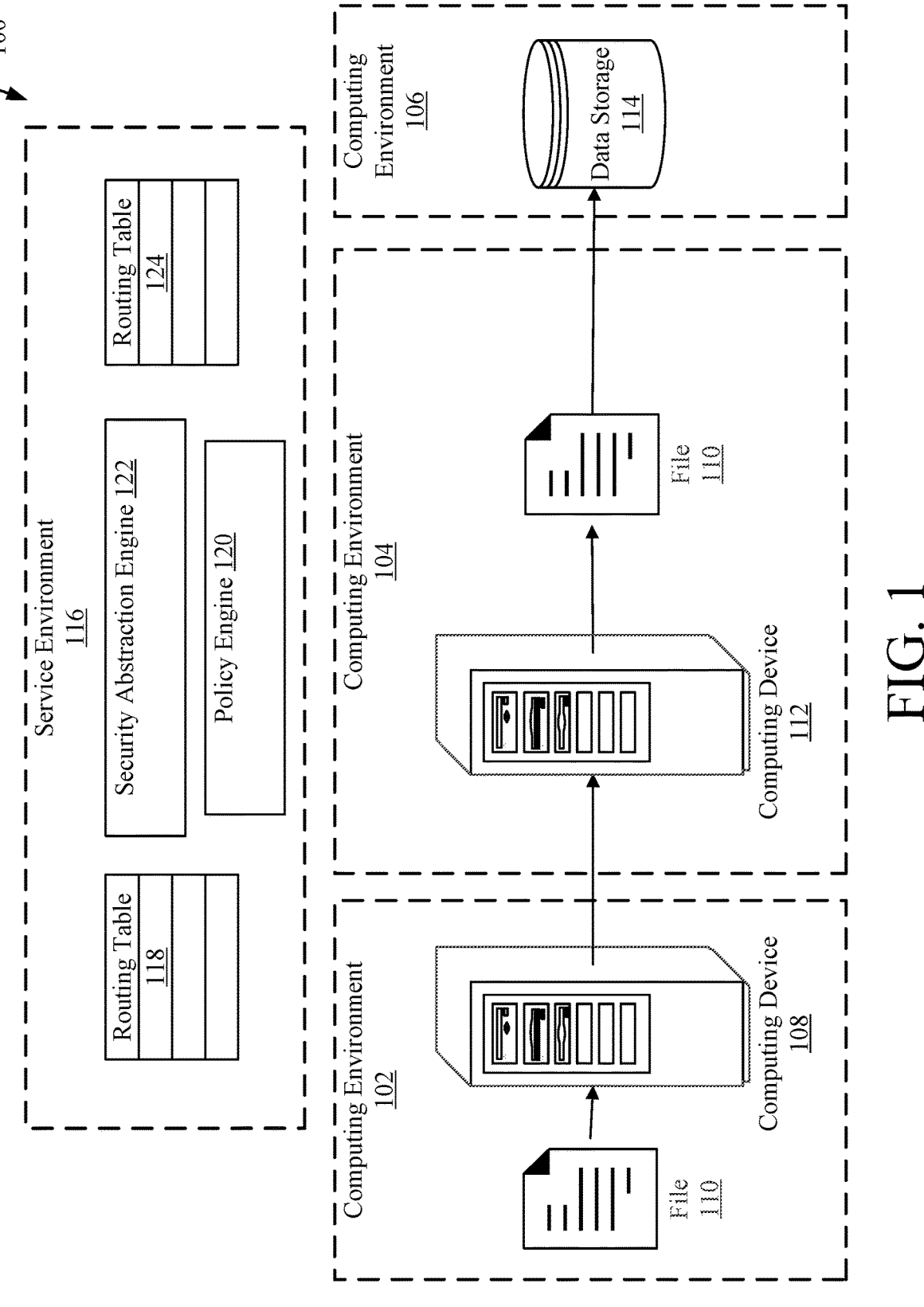
FIG. 1 illustrates an example system for implementing a software-based security abstraction engine that is implemented in an OWT system.

Many computing environments and software systems employ dedicated hardware components that are used to provide data security and policy enforcement for data being transferred or stored. Policy enforcement refers to the process of managing data, device, and network access and functionality in accordance with one or more policies defining the conditions under which such access and functionality are permitted. In many cases, such hardware components negatively impact the scalability of computing environments and software systems, due to the expense of the hardware components, the amount of time required to procure (e.g., order and receive) the hardware components, the difficulty of configuring the software of the hardware components, and the difficulty of physically installing the hardware components.

One example of the negative impact of such hardware components on scalability is illustrated in one-way transfer (OWT) systems. An OWT system refers to a computing system in which one or more endpoints are data diodes configured to ensure that data packets can be transferred only unidirectionally through the computing system. In many cases, OWT systems are used to protect a network or endpoints against outbound data transmissions, malicious inbound data transmissions (e.g., viruses and malware), and cyberattacks. As one example, OWT systems facilitate the transfer of data between computing environments having the same or different security levels (e.g., high-security or low-security), where at least one of the computing environments is low-trust with respect to another of the computing environments. For instance, a first computing environment that is high-trust with respect to the devices of the first computing environment and/or with respect to devices of one or more other computing environments may receive data from a second computing environment that is considered to be low-trust by the first computing environment.

In examples, a high-trust environment refers to a system or network where the devices, applications, and users are considered trustworthy, and security measures are in place to establish and maintain that trust. In this type of environment, the devices and/or parties involved, such as devices, software, and users, are often authenticated, authorized, and/or adhere to established security policies and best practices. High-trust environments usually have rigorous access controls, encryption, and monitoring to ensure that trust is maintained and to minimize the risk of unauthorized access, data breaches, or other security incidents. Devices within high-trust environments may be authorized to access or be accessed by other devices based on security techniques that are implemented by the high-trust environments (e.g., unique encryption keys, secrets, or other cryptographical techniques). For instance, the communications transmitted by a high-trust environment may be considered trustworthy by other computing environments or devices based on the high-trust environment (or devices thereof) being included in an allowlist (e.g., a list of approved devices and/or computing environments). Alternatively, the communications transmitted by a high-trust environment may be considered trustworthy based on a password or credential provided with the communications. In some examples, the devices in a high-trust environment do not require authentication to access or be accessed by other devices. A high-trust environment generally does not expose the security techniques implemented by the high-trust environment to other computing environments, which may be considered low-trust or no-trust environments by the high-trust environment.

By contrast, a low-trust or no-trust environment refers to a system or network where the devices, applications, and/or users are not implicitly trusted or where there is a high risk of unauthorized access or malicious activities. Low-trust or no-trust environments may have limited or no security measures in place, or may include or be connected to one or more external or unmanaged devices. Alternatively or additionally, a low-trust or no-trust environment refers to an environment in which the devices are not considered to be secured or trustworthy by other devices within and/or external to the low-trust or no-trust environments. As the security techniques implemented by the high-trust environment are not exposed to low-trust or no-trust environments, low-trust or no-trust environments may not be able to access or communicate with a high-trust environment without performing various authorization and/or authentication steps that need not be performed by devices in high-trust environments. In examples, an OWT system may span or include multiple computing environments that are separated by one or more boundaries between computing environments of different trust levels and/or security levels.

The data diodes of an OWT system ensure unidirectional data packet transfer through implementation of hardware and/or software components. In one example, a data diode includes a transmit-only network interface card (NIC). A transmit-only NIC transmits data to an endpoint but cannot receive data from the endpoint due to the physical severing of the receive pin on the network controller chip of the transmit-only NIC. The transmit-only NIC may also comprise firmware which sets the link state of the transmit-only NIC to always be "up" (e.g., enabled and/or active). In another example, a data diode implements a standard (e.g., commodity) NIC and a Y-splitter cable. The Y-splitter separates a data transmission signal such that a first cable of the Y-splitter is connected to a receiving device and a second cable of the Y-splitter is directed back to the transmitting device to establish a layer-1 link state. In yet another example, a data diode implements one or more field-programmable gate array (FPGA) devices to ensure unidirectional data flow.

In examples, the data diodes transmit received data to a dedicated policy enforcement device or to a device coupled to a dedicated policy enforcement device. The dedicated policy enforcement device applies one or more policies to the data being transmitted in the OWT system. If the policies are successfully applied to the data, the dedicated policy enforcement device enables the data to continue being transmitted through the OWT system. However, if one or more of the policies are not successfully applied to the data, the dedicated policy enforcement device prevents the data from being transferred through the OWT system. In most cases, the dedicated policy enforcement device is an expensive hardware device that is hard-wired to the data diode and/or to one or more other devices in the OWT system. As such, when a dedicated policy enforcement device needs to be replaced or an additional dedicated policy enforcement device needs to be added to the OWT system, a significant amount of manual intervention is required to physically install and/or replace the dedicated policy enforcement device. Such manual intervention often takes time and is prone to human error, which can result in service interruptions and breaches in data security.

The present disclosure provides an alternative solution to using the above-described, dedicated hardware components for policy enforcement. Embodiments of the present disclosure describe systems and methods for implementing a software-based security abstraction engine for policy enforcement. In embodiments, a first device in an OWT system receives data (e.g., a file or streaming data) to be transmitted to a destination endpoint via the OWT system as part of a data transfer. The data is associated with a data identifier that is assigned on a per-data basis (e.g., per-file or per-data stream) to uniquely identify the data and/or to indicate a type of data. The data transfer is associated with a dataflow identifier that is used to identify a first set of one or more policies to be applied to the data during the data transfer. Identifying the first set of policies may include accessing a data structure (e.g., a data table, data array, or a data mapping) that stores correlations between respective dataflow identifiers, sets of policies, and/or source identifiers (e.g., an identifier for the first device, a component of the first device, or a source endpoint that provided the data to the first device). In examples, each set of policies is associated with a use case for a data transfer. The use case describes a user objective or a specific scenario for the data transfer. For instance, a first use case for transmitting data to a first recipient may be associated with a first policy, whereas a second use case for transmitting data to a second recipient may be associated with a second policy. Each policy in the first set of policies comprises or represents one or more operations to be performed on data during a data transfer. Examples of policies in the first set of policies include antivirus scanning policies, watch word detection policies, data hashing policies, digital signature policies, and file type checking and routing policies.

A policy engine associated with the first set of policies is identified based on the dataflow identifier and/or the first set of policies. For instance, the data structure discussed above may also identify a policy engine to be used to execute each set of policies. A policy engine refers to a software component that enforces rules or policies relating to the access and functionality of data, device resources, and network resources. The identified policy engine may be selected from a set of a plurality of policy engines. The policy engines in the set of the policy engines may each be configured differently and may each be used to apply policies for different use cases. After selecting a policy engine, the identified policy engine applies the first set of policies to the data. In some examples, applying the first set of policies comprises creating a digital signature for each operation that is successfully executed as part of the first set of policies. For instance, a security mechanism, such as a hardware security module (HSM), may be used to generate a cryptographic key that is applied to an operation (or the result of an operation) associated with a set of policies to create a digital signature. The result may be a transformation or modification of the data, an output of an operation, or an indication of whether the operation was successful (e.g., a numerical value or a textual label). In some examples, the policy engine terminates the data transfer if any of the policies in the first set of policies are not successfully applied to the data.

A security abstraction engine is provided the data and the digital signatures. In examples, the security abstraction engine is a software engine implemented as a service to facilitate secure, high-assurance data transfer across data boundaries of an OWT system. The security abstraction engine is cloud-scale deployable, does not rely on specific hardware, and abstracts customer-specific implementations of security controls. The security abstraction engine provides a reliable initial codebase that can be configured to meet individual customer needs. The security abstraction engine also uses software-defined networking that is not accessible to customers or third parties to enforce unidirectional data flow. In examples, the security abstraction engine evaluates the digital signatures to determine whether the digital signatures are valid (e.g., to establish the provenance of the file). The determination may comprise comparing attributes of the digital signatures to expected attributes for the digital signatures. For example, the security abstraction engine may use a policy definition to compare the number of the received digital signatures, the versions of the received digital signatures, and/or the received digital signatures themselves to corresponding attribute values expected for digital signatures created by executed a particular set of policies.

If the security abstraction engine determines that at least one of the digital signatures is invalid, the security abstraction engine may terminate the data transfer. Alternatively, the security abstraction engine may attempt a corrective action, such as causing a policy or operation to be executed, removing a portion of the data from the data transfer, causing the data to be retransmitted, or providing a notification that one or more digital signatures are invalid to a corrective component of the OWT system. However, if the security abstraction engine determines that the digital signatures are valid, the security abstraction engine creates a provenance digital signature for the data to verify that the first set of policies has been successfully applied to the data. The security abstraction engine also applies a second set of one or more policies to the data. The second set of policies is selected based on the file type or the content of the data. In some examples, the second set of policies is regulated based on one or more regulatory authorities (e.g., a government authority or an industry authority). Examples of policies in the second set of policies include code validation policies, content sanitization policies, schema validation policies, and video transcoding policies. In at least one example, the provenance digital signature is created for the data after the second set of policies has been applied to the data.

After the second set of policies has been applied to the data, a second device or destination endpoint in the OWT system that is intended to receive to the data is identified. Identifying the second device or destination endpoint may include accessing a data structure that stores correlations between respective dataflow identifiers and destination identifiers (e.g., an identifier for a customer, a device, or a process that is to receive the data). The data is then transmitted to the second device or destination endpoint to complete (or as part of) the data transfer.

As such, the present disclosure provides a plurality of technical benefits and improvements over previous solutions that use dedicated hardware components for policy enforcement. These technical benefits and improvements include, among others, providing a software-based, cloud-scaled service that abstracts the policy enforcement of dedicated hardware components and implements functionality to ensure unidirectional data flow; validating that policy enforcement provided by the software-based, cloud-scaled service meets or exceeds the policy enforcement requirements or standards for dedicated hardware components used for policy enforcement; providing a consistent user experience via use of a reliable, configurable initial codebase; and ensuring the data security of data that is transferred and/or stored using an OWT system.

FIG. 1 illustrates a system for implementing a software-based security abstraction engine. System 100, as presented, is a combination of interdependent components that interact to form an integrated whole. Components of system 100 may be hardware components or software components (e.g., application programming interfaces (APIs), modules, run-time libraries) implemented on and/or executed by hardware components of system 100. In one example, components of system 100 are distributed across multiple processing devices or computing systems.

In FIG. 1, system 100 represents an OWT system for transmitting data between different computing environments. System 100 comprises computing environments 102, 104, and 106 and service environment 116. In examples, computing environments 102,104, and 106 are implemented in a cloud computing environment or another type of distributed computing environment and are subject to one or more distributed computing models/services (e.g., Infrastructure as a Service (IaaS), Platform as a Service (PaaS), Software as a Service (SaaS), Functions as a Service (FaaS)). In some examples, service environment 116 is implemented locally in one or more of computing environments 102, 104, and 106. For instance, one or more computing devices in computing environments 102,104, and/or 106 may each comprise a separate instance of service environment 116. In other examples, service environment 116 is implemented separately from one or more of computing environments 102,104, and 106. For instance, service environment 116 may be implemented in a cloud computing environment that is remotely accessible by computing environments 102,104, and/or 106 via a network, such as a private area network (PAN), a local area network (LAN), or a wide area network (WAN).

Although FIG. 1 is depicted as comprising a particular combination of computing environments and devices, the scale and structure of devices and computing environments described herein may vary and may include additional or fewer components than those described in FIG. 1. Further, although examples in FIG. 1 and subsequent figures will be described in the context of OWT systems and file transfers between computing environments in which at least one computing environment is considered low-trust by another computing environment, the examples are equally applicable to non-OWT systems and other types of data transfers between computing environments of various (or the same) types, trust levels, and security levels. For instance, the examples are applicable to data transfers between computing environments in which devices executing in one or more the computing environments are trusted by devices executing within the other computing environments (e.g., the computing environments are high-trust with respect to each other). Moreover, the examples are equally applicable to data transfers between components of a single device. For instance, the security abstraction engine may be implemented on a single device having containers (e.g., software data structures for storing data and data objects) with different policies and access privileges to ensure that network traffic received by one a first containers cannot be accessed by a second container that is considered low-trust by the first container.

With respect to FIG. 1, computing environment 102 represents a low-trust computing environment in which devices executing within computing environment 102 are not trusted by devices executing within computing environments 104 or 106. In such examples, computing environment 102 may be physically separated from computing environments 104 and 106 such that computing environment 102 is in a first physical location (e.g., region, building, or room) and computing environments 104 or 106 are in a different second physical location. Alternatively, computing environment 102 and computing environments 104 and/or 106 may share the same physical location.

Computing environment 102 comprises computing device 108. Examples of computing device 108 include data diodes and server devices, such as web servers, file servers, application servers, and database servers. Computing device 108 receives input data, such as file 110, from users or computing devices within or accessible to computing environment 102. File 110 may comprise one or more types of data (e.g., audio data, touch data, text-based data, gesture data, and/or image data) and be associated with a data identifier that uniquely identifies file 110 and/or that indicates a file type of file 110. In some examples, file 110 is received as part of a data transfer request to transmit file 110 to a destination endpoint via system 100. In other examples, file 110 is retrieved as part of a code deployment request. For instance, file 100 may comprise source code and be retrieved from a source code repository (e.g., a low-trust or low security computing environment) with the intent to deploy the complied source code in a secure computing environment (a high-trust or high-security computing environment). In at least one example, computing device 108 performs one or more processing steps on file 110, such as file segmentation (e.g., segmenting file 110 into one or more data chunks and corresponding data segments), metadata insertion (e.g., inserting sequence identification information into the data chunks and data segments), and data error correction (e.g., applying forward error correction techniques to the data chunks and data segments).

Computing device 108 transmits file 110 (and/or data associated with file 110) to computing environment 104. In examples, computing environment 104 represents a high-trust computing environment that considers computing environment 102 to be low-trust. Computing environment 104 comprises computing device 112. Examples of computing device 112 include those devices described above with respect to computing device 108. In some examples, computing device 112 is located proximate to computing device 108 (e.g., in the same building or room). For instance, computing device 112 and computing device 108 may be located in the same room of a data center such that computing device 108 is located in a first data rack (e.g., server rack or data cabinet) and the computing device 112 is located in a second data rack or a different shelf of the first data rack. In such an example, computing device 112 and computing device 112 may be directly connected via point-to-point cabling. In other examples, computing device 112 is located remotely from computing device 108 (e.g., in a different building or room).

In FIG. 1, computing device 112 receives file 110 from computing device 108. In response to receiving file 110, computing device 112 may access service environment 116. Alternatively, computing device 108 may access service environment 116 in response to receiving file 110 or in response to processing steps performed by computing device 108. In examples, service environment 116 provides access to various computing services and resources (e.g., applications, devices, storage, processing power, networking, analytics, intelligence). In FIG. 1, service environment 116 comprises routing table 118, policy engine 120, security abstraction engine 122, and routing table 124.

Figures 2A, 2B:
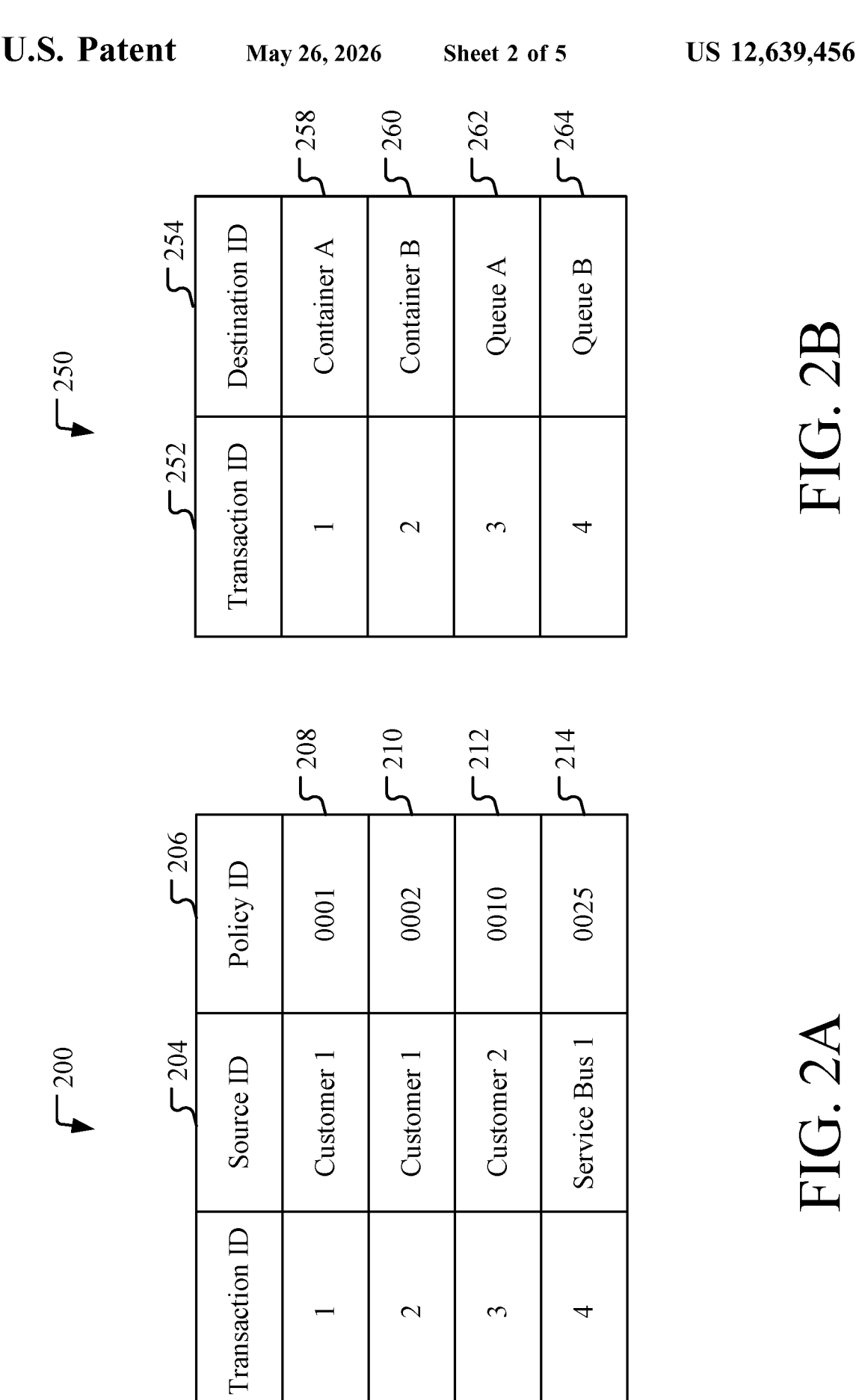
FIGS. 2A and 2B illustrate example routing tables for facilitating data transfers using the software-based security abstraction engine described herein.

Routing table 118 is a data structure comprising correlation information for data transferred using system 100. In examples, the correlation information includes dataflow identifiers, source identifiers, and/or sets of policies (or indications thereof). For instance, FIG. 2A illustrates an example routing table 200 that comprises columns Dataflow ID 202, Source ID 204, Policy ID 206, and rows 208, 210, 212, and 214. Dataflow ID 202 comprises dataflow identifiers that represent a particular data transfer use case for file 110 and are assigned to each data transfer that is submitted to system 100. Source ID 204 comprises source identifiers for a source endpoint (e.g., a customer, a device, or a process that has submitted a data transfer request). In some examples, as illustrated by rows 208, 210, 212 and 214, Policy ID 206 comprises policy identifiers for a set of policies. The policy identifiers are used to identify (e.g., in a lookup table) a set of one or more operations to be applied to file 110. For instance, a first operation may be executable instructions for applying antivirus scanning using a first antivirus engine, a second operation may be executable instructions for applying antivirus scanning using a second antivirus engine, and a third operation may be executable instructions for performing watch word detection. In other examples, Policy ID 206 comprises the set of operations corresponding to the set of policies to be applied to file 110. In yet other examples, Policy ID 206 comprises an identifier for a policy engine to be used to apply a set of policies to file 110. The policy engine indicated by the identifier may be configured to execute a predefined set of operations or apply a predefined set of policies.

Referring back to FIG. 1, the dataflow identifier for file 110 is used to search routing table 118 for a first set of policies to be applied to file 110. In examples, the first set of policies includes policies for antivirus scanning engine execution, watch work detection, data and file hashing, digital signature generation, file type checking and routing (e.g., routing file 110 to a particular policy enforcement component associated with a file type), data sanitization (e.g., splitting, removal, and reconstruction of data content), and data journaling (e.g., data retention). The first set of policies may also include additional policies for evaluating, auditing, and/or otherwise managing data. The first set of policies may be defined at various levels of granularity, such as at the cloud level, at the customer subscription level, or at the dataflow level. As one example, the selection of an antivirus scanner may be a function of a source environment of file 110, a destination environment for file 110, a customer profile, or a data transfer use case profile. Upon identifying the first set of policies, a policy engine for applying the first set of policies, such as policy engine 120, is identified based on the dataflow identifier or the first set of policies. For example, a data structure (e.g., routing table 118 or a separate configuration table) may comprise entries corresponding to multiple different policy engines. The dataflow identifier or the first set of policies may be used to select an entry in the data structure that correlates the dataflow identifier or the first set of policies to policy engine 120. Alternatively, policy engine 120 may be automatically selected and invoked in response to preparing the first set of policies to be executed. For instance, a particular policy engine to be used to execute a set of policies may be hardcoded into a policy or into one or more operations of the policy. In such examples, multiple policy engines 120 may be used to apply the first set of policies to file 110.

Policy engine 120 is a software engine that applies policies to data transmitted using system 100. In examples, policy engine 120 applies the first set of policies to file 110.

Applying the first set of policies includes executing one or more operations associated with the first set of policies on file 110. Each operation may be a set of executable instructions that is executed by policy engine 120 serially or in parallel with other operations. As one example, policy engine 120 may execute a first operation that causes policy engine 120 to make a call (e.g., request) to a first antivirus service, where the call includes a pointer to the data for which antivirus scanning is to be performed. After (or during) execution of the antivirus scanning by the first antivirus service, policy engine 120 may execute a second operation that causes policy engine 120 to make a call to a second antivirus service. In some examples, policy engine 120 applies additional policies to file 110 or performs additional processing on file 110 based on the data identifier for or a file type of file 110. For example, policy engine 120 may apply a first type of processing or policies to a first type of file 110 (e.g., a Portable Document Formats (PDF) file) and apply a second type of processing or policies to a second type of file 110 (e.g., a Joint Photographic Experts Group (JPEG) file).

In examples, policy engine 120 creates a digital signature for each operation that is successfully executed for file 110. Creating a digital signature may include applying a cryptographic key to an operation or to the result of an operation. For instance, a cryptography device or service, such as an HSM or a certificate authority, may use public key cryptography to create a public-private key pair. The private key portion of the public-private key pair may be provided to policy engine 120 and used by policy engine 120 to create a digital signature. If a digital signature is successfully created for each operation associated with the first set of policies, the policy engine 120 provides file 110 and the set of digital signatures associated with the operations to security abstraction engine 122. For instance, policy engine 120 provides an extensible markup language (XML) manifest comprising the set of digital signatures to security abstraction engine 122 along with file 110. In at least one example, instead of creating a digital signature for each operation that is executed, policy engine 120 creates a digital signature for each policy that is executed or for the entire first set of policies.

Security abstraction engine 122 is a software engine that abstracts security controls and validates the policies applied to file 110 by policy engine 120. In examples, security abstraction engine 122 evaluates the digital signatures created by policy engine 120 to determine whether the digital signatures are valid. This evaluation ensures that the operations associated with the first set of policies were executed as expected and that the digital signatures have not been modified during transit from policy engine 120. Evaluating the digital signatures comprises comparing the digital signatures (or attributes of the digital signatures) to expected digital signatures (or expected attributes of the digital signatures) for the first set of policies. For instance, a policy definition for the first set of policies may be stored by (or accessible to) security abstraction engine 122. The policy definition indicates the expected digital signature for each operation executed as part of the first set of policies. Upon receiving the digital signatures for file 110, security abstraction engine 122 compares the digital signatures for file 110 to the expected digital signature listed in the policy definition. If a digital signature for file 110 does not match a corresponding digital signature listed in the policy definition, the non-matching digital signature for file 110 is determined to be invalid. Upon determining that one or more of the digital signatures for file 110 are invalid, security abstraction engine 122 may terminate the transfer of file 110 via system 100 or attempt to perform a corrective action for the data transfer, as previously described.

However, if the digital signatures for file 110 match the digital signatures listed in the policy definition, the digital signatures for file 110 are determined to be validated and security abstraction engine 122 creates a provenance digital signature for file 110. Creating a provenance digital signature may include applying a cryptographic key to file 110, as discussed above. The provenance digital signature verifies that the first set of policies has been successfully applied to file 110. Security abstraction engine 122 appends the provenance digital signature to file 110 or otherwise associates the provenance digital signature with file 110. For instance, the provenance digital signature may be added to metadata of file 110 or stored in a data structure that correlates the provenance digital signature to file 110.

Security abstraction engine 122 also applies a second set of policies to file 110. In examples, the second set of policies includes policies for code validation (e.g., source code and compiled code validation), data sanitization, schema validation (e.g., file schema and data schema validation), and video and audio transcoding. In a specific example, the second set of policies includes a schema validation policy that describes and validates the structure and content of XML documents. For instance, the schema validation policy is used to define elements (e.g., simple elements, complex elements, or global elements), attributes (e.g., data that provides properties of a specific element), and data types (e.g., Boolean, integer, or string) that can be included in an XML document. The schema validation policy causes content that is not defined by the schema validation policy to be removed from XML documents being transmitted via system 100. The second set of policies may also include additional policies for evaluating, auditing, and/or otherwise managing data. Although specific types of policies have been provided herein as examples for each of the first set of policies and the second set of policies, such examples may be included in either or both of the first set of policies and the second set of policies.

Security abstraction engine 122 may comprise various policy enforcement components for implementing the second set of policies. Each of these policy enforcement components may represent a different, dedicated hardware device that is used for policy enforcement in conventional policy enforcement systems. In one example, security abstraction engine 122 implements a code processing function, a complex document processing function, and a video processing function. The code processing function is assigned to process software artifacts, such as software libraries, executable files, software builds, and the like. The code processing function validates that file 110 is a particular type (e.g., a software artifact type) and may perform additional functions, such as compiling source code, validating code, or generating a digital signature for a file. The complex document processing function is assigned to process complex documents. A complex document refers to a document that includes document objects other than text and/or images (e.g., charts, tables, macros, and other executable content), such as PDF documents, XML documents, presentation documents, spreadsheet documents, and the like. The complex document processing function performs content standardization, such as removing content (e.g., macros and images) from file 110 and reformatting the content of file 110. The video processing function is assigned to process video data, such as video files or video streams. The video processing function processes video content (e.g., modifies aspect ratio, frame rate, color, and other attributes of the video content) and transcodes file 110 using one or more data compression and data decompression utilities, such as a codec.

Routing table 124 is a data structure comprising routing information for data transferred using system 100. In examples, the routing information includes at least dataflow identifiers and destination identifiers. For instance, FIG. 2B illustrates an example routing table 250 that comprises columns Dataflow ID 252 and Destination ID 254 and rows 258, 260, 262, and 264. Dataflow ID 252 comprises dataflow identifiers that represent a particular data transfer use case for file 110 and are assigned to each data transfer that is submitted to system 100. Destination ID 254 comprises destination identifiers for a destination endpoint (e.g., a customer, a device, a location, or a process that is intended to receive file 110). For instance, the destination identifiers may identify a container or queue in system 100 to which file 110 is to be delivered to complete a data transfer request. In some examples, the information in routing tables 200 and 250 (and routing tables 118 and 124, by extension) may be included in the same table.

Referring back to FIG. 1, the dataflow identifier for file 110 is used to search routing table 124 for a destination endpoint for file 110. Upon identifying a destination endpoint, file 110 is transmitted to computing environment 106. In some examples, computing environment 106 represents a highest-security computing environment with respect to computing environments 102 and 104. In other examples, computing environment 106 represents a computing environment having a security level that is the same as or is lower than the security levels of computing environments 102 and/or 104. In FIG. 1, computing environment 106 comprises data storage 114. Examples of data storage 114 include direct-attached storage devices (e.g., hard drives, solid-state drives, and optical disk drives), network-based storage devices (e.g., storage area network (SAN) devices and network-attached storage (NAS) devices), and other types of memory devices. Data storage 114 receives and stores file 110. In some examples, data storage 114 provides file 110 to a destination endpoint or to another device that facilitates delivery of file 110 to a destination endpoint based on a destination identifier stored in routing table 124.

Having described a system that may be employed by the embodiments disclosed herein, methods that may be performed by such systems are now provided. Although method 300 is described in the context of system 100 of FIG. 1, the performance of method 300 is not limited to such examples.

Figure 3:
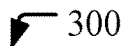
FIG. 3 illustrates an example method for implementing a software-based security abstraction engine.
Figure 3:
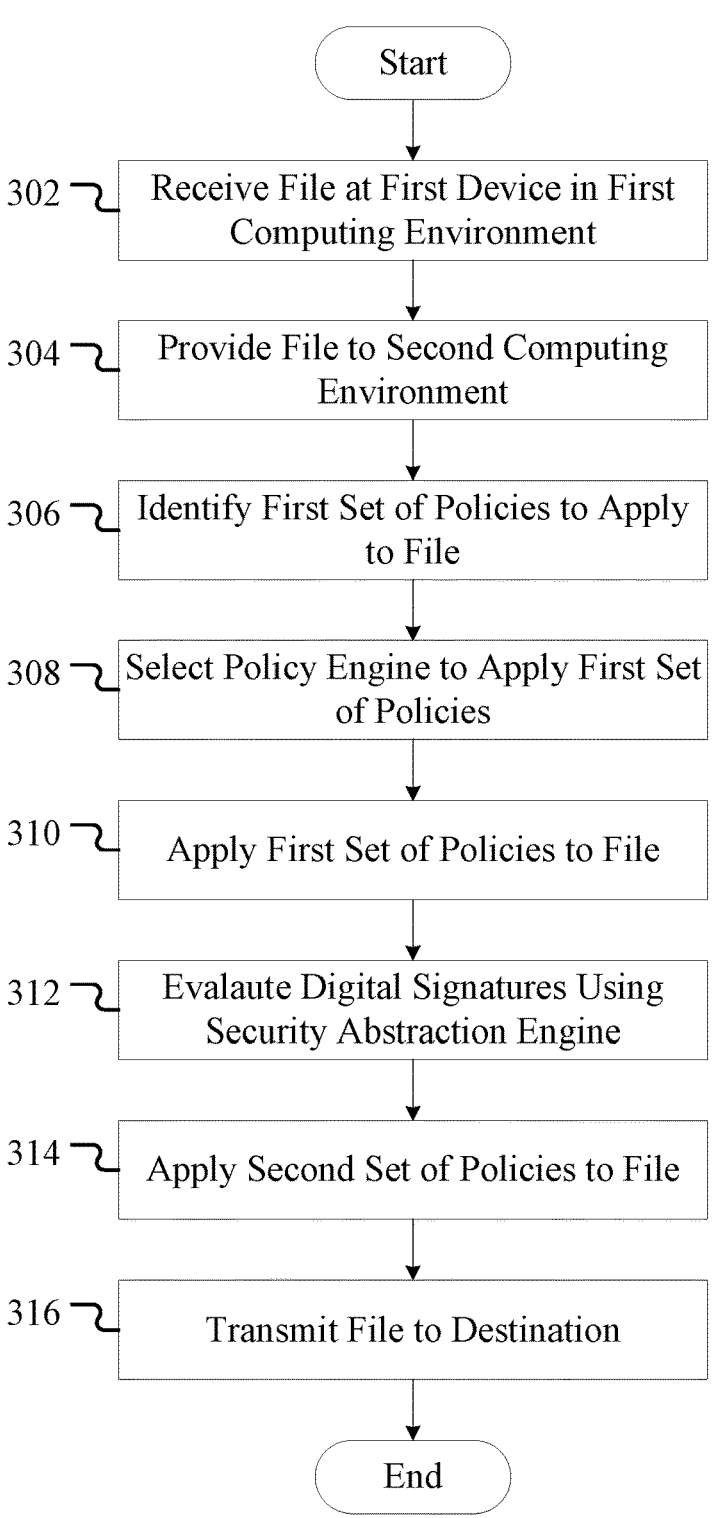

FIG. 3 illustrates a method 300 for implementing a software-based security abstraction engine. In examples, the security abstraction engine is implemented in an OWT system that comprises multiple computing environments. One or more of the computing environments may differ in trust level, security level, or physical location. For instance, in some embodiments, one of the computing environments is a low-security environment and another of the computing environments is a high-security environment. In other embodiments, one or more of the computing environments are considered low-trust to the other computing environments. The OWT system may be configured such that a source endpoint and/or a destination endpoint of data transmitted through the OWT is unknown to one or more of the computing environments.

Method 300 begins at operation 302, where a file, such as file 110, is received at a first device, such as computing device 108. In examples, the file is received as part of a data request (e.g., a file transfer request or a code deployment request) that is identified by a dataflow identifier, such as Dataflow IDs 202 and 252. The file is associated with a data identifier that may be included in the file or in metadata of the file. In some examples, the first device is located in a first computing environment of an OWT system, such as computing environment 102. The file originates at a source endpoint in the first computing environment, or the file is provided to the first computing environment from an external source endpoint. Examples of external source endpoints include personal computers (PCs), server devices, mobile devices (e.g., smartphones, tablets, laptops, personal digital assistants (PDAs)), wearable devices (e.g., smart watches, smart eyewear, fitness trackers, smart clothing, body-mounted devices, head-mounted displays), gaming consoles or devices, and Internet of Things (IoT) devices. In at least one example, the source endpoint comprises or has access to one or more repositories storing source code files and/or executable files. Upon receiving the file, the first device may perform one or more processing steps on the file, such as file segmentation, metadata insertion, and data error correction.

At operation 304, the first device provides the file to a second computing environment of the OWT system, such as computing environment 104. In some examples, the second computing environment is implemented in the first device. For instance, a first component or system of the first device may implement the first computing environment and a second component or system of the first device may implement the second computing environment. In other examples, the second computing environment comprises a second device, such as computing device 112. In such examples, although the second computing environment may be logically distinct from the first computing environment, the second device may be physically located proximate to the first device. For instance, the first device and the second device may be located in the same building, the same room, or the same data rack. Alternatively, the second device may be physically located remotely from the first device (e.g., in a different region or building).

At operation 306, the second computing environment uses the dataflow identifier for the file to identify a first set of policies to be applied to the file. In examples, identifying the first set of policies comprises accessing a service environment, such as service environment 116. The service environment may be implemented in the second computing environment or may be accessed remotely from the first computing environment and/or second computing environment. The dataflow identifier may be used to search a data structure in the service environment, such as routing table 118, for a first set of policies correlated to the dataflow identifier. The first set of policies may include policies relating to, for example, antivirus scanning, watch work detection, data and file hashing, digital signature generation, file type checking and routing, data sanitization, and data journaling. The first set of policies may be stored in the data structure as one or more sets of operations that correspond to executable instructions. Alternatively, the first set of policies may be represented in the data structure using a policy identifier, such as Policy ID 206. The data structure may also correlate the dataflow identifier and/or the first set of policies to a source identifier that identifies a source (e.g., a device, a customer, or a process) associated with the file or the data request for the file. For instance, a source identifier may indicate a container implemented on the first device for storing data and files of a particular customer. The container may be assigned to be used for one or more particular use cases, whereas a different container implemented on the first device is assigned to be used for alternative use cases.

At operation 308, a policy engine in the service environment, such as policy engine 120, is selected to apply the first set of policies to the file. In examples, the policy engine is selected based on the first set of policies and/or the dataflow identifier for the file. For instance, the data structure described above may also correlate particular policy engines to particular set of policies and/or the dataflow identifiers. Alternatively, executing a policy or an operation may invoke one or more policy engines. As an example, the executable instructions corresponding to an operation may define a policy engine to be used to execute a policy or a set of operations associated with a policy. Accordingly, multiple policy engines may be used to apply the first set of policies to the file.

At operation 310, the policy engine applies the first set of policies to the file. Applying the first set of policies includes executing one or more operations associated with the first set of policies on the file. In examples, each of the operations may have been digitally signed previously to ensure that the operations have not been corrupted or impermissibly modified. In some examples, the policy engine additionally or alternately applies additional policies or executes additional operations based on the data identifier for or a file type of the file. Upon executing the first set of policies, the policy engine creates a digital signature for each operation that is successfully executed for the file. The digital signatures provide assurance that each operation was executed successfully and/or in an expected manner. Creating the digital signature may include applying a cryptographic key to an operation or to the result of an operation. For instance, a private key portion of a public-private key pair may be applied to a set of executable instructions corresponding to an operation. Alternatively, the public key portion may be applied to the file or to a portion of the file that has been modified by applying the first set of policies to the file. The digital signatures for the operations associated with the first set of policies may be applied to the content (e.g., body) of the file, applied to the metadata of the file, included in a separate document or file (e.g., a manifest or a similar document), or stored in a data structure (e.g., a table or a dataflow log). In some examples, if at least one policy in the first set of policies is not successfully applied to the file, the policy engine causes the transfer of the file to be halted or cancelled.

At operation 312, a security abstraction engine in the service environment, such as security abstraction engine 122, evaluates the digital signatures. In examples, the file and the digital signatures associated with the first set of policies are provided to the security abstraction engine by the policy engine. The security abstraction engine evaluates the digital signatures created by policy engine to verify that the policy engine executed the first set of policies successfully and/or in an expected manner. The security abstraction engine also evaluates the digital signatures to verify that the digital signatures have not been modified during transit from the policy engine. In examples, evaluating the digital signatures for the file comprises comparing the digital signatures (or attributes of the digital signatures) for the file to expected digital signatures (or expected attributes of the digital signatures) for the first set of policies. For instance, the security abstraction engine may compare the digital signatures for the file to a trusted set of digital signatures that were previously generated by applying the first set of policies to one or more other files. Upon determining that the digital signatures are valid (e.g., determining that the first set of policies were successfully applied to the file and the digital signatures have not been modified), the security abstraction engine generates a provenance digital signature for the file. The provenance digital signature may be applied to the file or stored in another location, as discussed above.

At operation 314, the security abstraction engine applies a second set of policies to the file. In examples, the security abstraction engine comprises one or more policy enforcement components (e.g., software engines, functions, or other processing logic) for applying policies to files based on file type, other file attributes, and/or file content. For instance, security abstraction engine may comprise a code processing component, a complex document processing component, and a video processing component. The code processing component may process software artifact files, the complex document processing component may process complex document files, and the video processing component may process video and/or audio files. In examples, the file is provided to the relevant policy enforcement component based on the file type or content of the file. For instance, the policy engine, which is configured to perform file type checking and routing, may route the file to the corresponding policy enforcement component of the security abstraction engine based on a file type determined during a file type checking operation of the first set of policies. Alternatively, upon receiving the file, the security abstraction engine may determine the file type of the file and provide the file to the policy enforcement component used to process the determined file type. As a specific example, a file that is determined to be a source code file is provided to the code processing component.

Upon receiving the file, the policy enforcement component applies the second set of policies to the file. The second set of policies may include policies relating to, for example, code compiling and validation, content sanitization, schema validation, and audio/video transcoding. As one example, the second set of policies may include a schema validation policy that describes and validates the structure and content of XML documents. Such a schema validation policy causes content that is not defined by the schema validation policy to be removed from XML documents being transmitted via the OWT system. For instance, any elements, attributes, and/or data types that are not defined by the schema validation policy are removed from an XML file. In at least one example, the provenance digital signature is generated for the file after the second set of policies has been applied to the file.

At operation 316, the file is provided to a destination endpoint, such as data storage 114, based on the dataflow identifier for the file. In examples, the dataflow identifier may be used to search a data structure, such as routing table 124, for a destination endpoint for the file. For instance, the data structure may correlate the dataflow identifier to destination identifier, such as Destination ID 254. The destination identifier may identify a destination endpoint (e.g., a container or a storage location) for storing data and files of a particular customer. In some examples, the destination endpoint is located in a third computing environment of the OWT system, such as computing environment 106. In other examples, the third computing environment is implemented in the first device or in the second device. The destination endpoint may serve as a collection point for one or more components or devices within or external to the OWT system. In at least one example, the destination endpoint is a computing environment in which the file is to be deployed. For instance, a source code file may be built, compiled, and digitally signed as the file is transferred (or as part of transferring the file) through the OWT system. The compiled file can be safely deployed and executed in the computing environment based on the digital signature.

Figure 4:
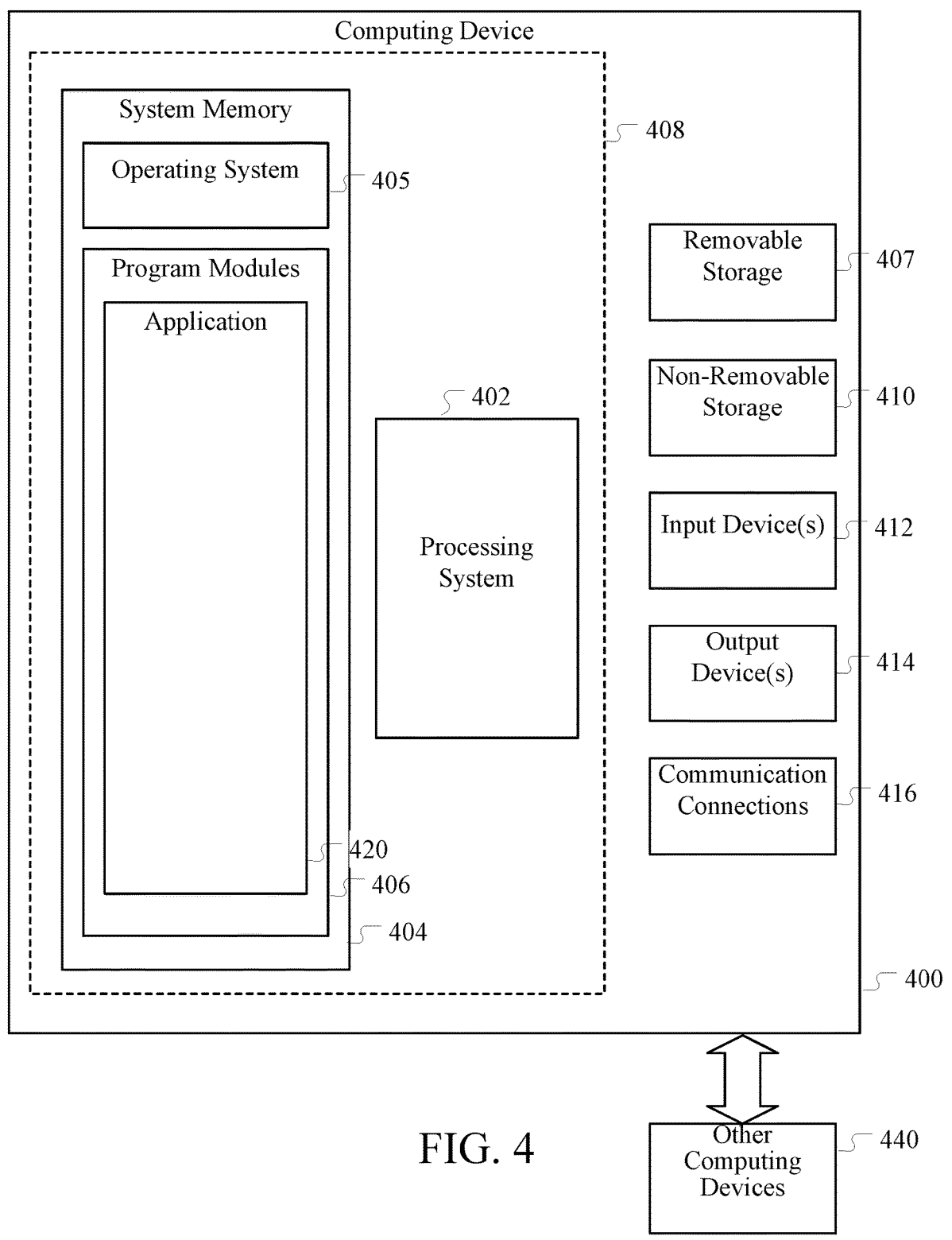
FIG. 4 is a block diagram illustrating example physical components of a computing device for practicing aspects of the disclosure.
Figure 5:
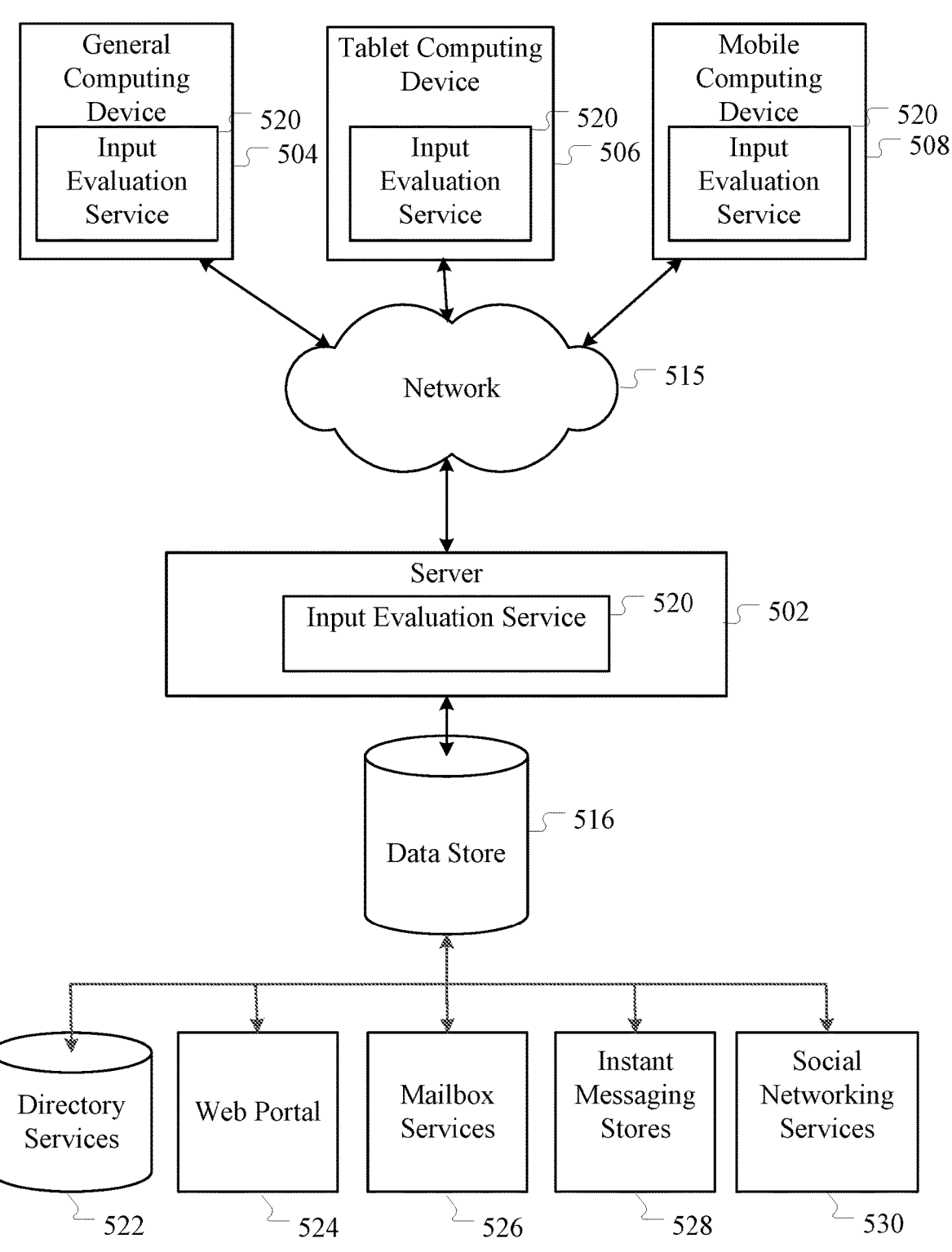
FIG. 5 is a simplified block diagram of an example distributed computing system for practicing aspects of the present disclosure.

FIGS. 4-5 and the associated descriptions provide a discussion of a variety of operating environments in which aspects of the disclosure may be practiced. However, the devices and systems illustrated and discussed with respect to FIGS. 4-5 are for purposes of example and illustration, and, as is understood, a vast number of computing device configurations may be utilized for practicing aspects of the disclosure, described herein.

FIG. 4 is a block diagram illustrating physical components (e.g., hardware) of a computing device 400 with which aspects of the disclosure may be practiced. The computing device components described below may be suitable for the computing devices and systems described above. In a basic configuration, the computing device 400 includes at least one processing system 402 and a system memory 404. Depending on the configuration and type of computing device, the system memory 404 may comprise volatile storage (e.g., random access memory (RAM)), non-volatile storage (e.g., read-only memory (ROM)), flash memory, or any combination of such memories.

The system memory 404 includes an operating system 405 and one or more program modules 406 suitable for running software application 420, such as one or more components supported by the systems described herein. The operating system 405, for example, may be suitable for controlling the operation of the computing device 400.

Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, or optical disks. Such additional storage is illustrated in FIG. 4 by a removable storage device 407 and a non-removable storage device 410.

As stated above, a number of program modules and data files may be stored in the system memory 404. While executing on the processing system 402 comprising one or more processors, the program modules 406 (e.g., application 420) may perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing systems/units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 407, and the non-removable storage device 410 are all computer storage media examples (e.g., memory storage). Computer storage media includes RAM, ROM, electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

FIG. 5 illustrates one aspect of the architecture of a system for processing data received at a computing system from a remote source, such as a personal computer 504, tablet computing device 506, or mobile computing device 508, as described above. Content displayed at server device 502 may be stored in different communication channels or other storage types. For example, various documents may be stored using a directory service 522, a web portal 524, a mailbox service 526, an instant messaging store 528, or a social networking site 530.

An input evaluation service 520 may be employed by a client that communicates with server device 502, and/or input evaluation service 520 may be employed by server device 502. The server device 502 may provide data to and from a client computing device such as a personal computer

504, a tablet computing device 506 and/or a mobile computing device 508 (e.g., a smart phone) through a network 515. By way of example, the computer system described above may be embodied in a personal computer 504, a tablet computing device 506 and/or a mobile computing device 508 (e.g., a smart phone). Any of these embodiments of the computing devices may obtain content from the store 516, in addition to receiving graphical data useable to be either pre-processed at a graphic-originating system, or post-processed at a receiving computing system.

As will be understood from the present disclosure, one example of the technology discussed herein relates to a system comprising: a processing system; and memory coupled to the processing system, the memory comprising computer executable instructions that, when executed, perform operations comprising: receiving a file at a first computing environment in a one-way transfer (OWT) system, the file being associated with a first dataflow identifier; identifying a first set of policies to apply to the file based on the first dataflow identifier; applying the first set of policies to the file using a policy engine, wherein the policy engine creates a set of digital signatures for the first set of policies; evaluating the set of digital signatures using a security abstraction engine; applying a second set of policies to the file using the security abstraction engine; and transmitting the file to a destination based on the first dataflow identifier.

In another example, the technology discussed herein relates to a method comprising: receiving a file at a first device in a first computing environment, the file being associated with a dataflow identifier; providing the file to a second device in a second computing environment that has access to a service environment; identifying, in the service environment, a first set of policies to apply to the file based on the dataflow identifier; applying, by a policy engine in the service environment, the first set of policies to the file; creating, by the policy engine, a set of digital signatures for the first set of policies; determining whether the set of digital signatures is valid by evaluating the set of digital signatures using a security abstraction engine in the service environment; in response to determining the set of digital signatures is valid, applying, by the security abstraction engine, a second set of policies to the file; and transmitting the file to a third computing environment based on the dataflow identifier.

In another example, the technology discussed herein relates to a device comprising: a processing system; and memory comprising computer executable instructions that, when executed, perform operations comprising: receiving data associated with a dataflow identifier that indicates a use case for the data; applying, by a policy engine, a first set of policies to the data based on the dataflow identifier; creating a set of digital signatures for the first set of policies; evaluating the set of digital signatures using a security abstraction engine; applying, by the security abstraction engine, a second set of policies to the data based on a type of the data; and providing the data to a destination based on the dataflow identifier.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:

a processing system; and memory coupled to the processing system, the memory comprising computer executable instructions that, when executed, perform operations comprising:

receiving, as part of a dataflow request, a file at a first computing environment in a one-way transfer (OWT) system, the file comprising a dataflow identifier indicating a use case for the dataflow request and a destination for the file;

identifying a first set of policies to apply to the file based on the dataflow identifier by accessing a first data structure comprising a mapping of the dataflow identifier to the first set of policies and to a source identifier of a requestor of the dataflow request;

applying the first set of policies to the file based on the dataflow identifier using a policy engine of the OWT system, wherein the policy engine creates a set of digital signatures indicating that the policy engine successfully applied the first set of policies to the file;

evaluating the set of digital signatures using a security abstraction engine of the OWT system by comparing the set of digital signatures to an expected set of digital signatures;

in response to determining the set of digital signatures is valid, applying a second set of policies to the file using the security abstraction engine based on a first file type of the file, wherein the security abstraction engine comprises a policy enforcement component corresponding to the first file type; and transmitting the file to the destination based on the dataflow identifier by accessing a second data structure comprising a mapping of the dataflow identifier to a destination identifier of the destination.

2. The system of claim 1, wherein the use case describes a user objective or a specific scenario associated with the dataflow request.

3. The system of claim 1, wherein the data structure is located in a service environment of the OWT system.

4. The system of claim 3, wherein:

receiving the file at the first computing environment comprises receiving the file at a first device in the first computing environment; and identifying the first set of policies further comprises:

providing, by the first device, the file to a second device in a second computing environment of the OWT system; and accessing, by the second device, the service environment.

5. The system of claim 4, wherein the first computing environment is a low-trust environment in which devices in the first computing environment are not trusted by devices in the second computing environment.

6. The system of claim 1, wherein applying the first set of policies to the file using the policy engine comprises:

identifying a correlation between the policy engine and at least one of the dataflow identifier or the first set of policies; and selecting the policy engine from a plurality of policy engines based on the correlation.

7. The system of claim 1, wherein the first set of policies comprises at least:

an antivirus scanning policy; and a file type checking policy.

8. The system of claim 1, wherein:

each policy in the first set of policies is associated with a set of operations; and creating the set of digital signatures for the first set of policies comprises:

executing each operation in the set of operations on the file; and creating a digital signature for each operation that is successfully executed.

9. The system of claim 1, wherein the expected set of digital signatures was generated by applying the first set of policies to other files, and wherein evaluating the set of digital signatures using the security abstraction engine comprises:

determining that the set of digital signatures matches the expected set of digital signatures; and creating, by the security abstraction engine, a provenance digital signature from the file.

10. The system of claim 1, wherein the policy enforcement component is a first policy enforcement component; and wherein the security abstraction engine further comprises configured to apply policies to a second file type that is different from the first file type.

11. The system of claim 10, wherein applying the second set of policies to the file comprises:

providing the file to the first policy enforcement component and not providing the file to the second policy enforcement component based on the first file type; and applying, by the first policy enforcement component, the second set of policies to the file.

12. The system of claim 10, wherein the first policy enforcement component and the second policy enforcement component are each:

a code processing component;

a complex document processing component; or a video processing component.

13. The system of claim 1, wherein the second set of policies comprises at least one of:

a code validation policy;

a content sanitization policy;

a schema validation policy; or an audio/video transcoding policy.

14. The system of claim 1, wherein transmitting the file to the destination comprises:

transmitting the file to the destination based on the mapping of the dataflow identifier to the destination identifier, wherein the destination is in a computing environment of the OWT system that is different from the first computing environment.

15. The system of claim 1, wherein the file is provided to the first computing environment by a computing device external to the OWT system; and wherein the first set of policies represents security controls abstracted from the computing device and specific to at least one of:

the computing device; or a particular user of the computing device.

16. A method comprising:

receiving, as part of a dataflow request, a file in a first computing environment in a one-way transfer (OWT) system, the file being associated with a dataflow identifier indicating a use case for the dataflow request and a destination for the file;

identifying, in a service environment of the OWT system, a first set of policies to apply to the file based on the dataflow identifier by accessing a first data structure comprising a mapping of the dataflow identifier to the first set of policies and to a source identifier of a requestor of the dataflow request;

applying, by a policy engine in the service environment, the first set of policies to the file based on the dataflow identifier;

creating, by the policy engine, a set of digital signatures for the first set of policies, wherein the set of digital signatures indicates that the policy engine successfully applied the first set of policies to the file;

determining, using a security abstraction engine in the service environment, whether the set of digital signatures is valid by comparing the set of digital signatures to an expected set of digital signatures;

in response to determining the set of digital signatures is valid, applying, by the security abstraction engine, a second set of policies to the file based on a file type of the file, wherein the security abstraction engine comprises a policy enforcement component for processing the file type; and transmitting the file to a third computing environment based on the dataflow identifier by accessing a second data structure comprising a mapping of the dataflow identifier to a destination identifier of a recipient of the file.

17. The method of claim 16, wherein the second computing environment, the third computing environment, and the service environment are part of the OWT system.

18. The method of claim 16, wherein applying the first set of policies to the file comprises:

executing a first antivirus scanning engine for the file as part of a first policy in the first set of policies; and executing a second antivirus scanning engine for the file as part of a second policy in the first set of policies.

19. A device comprising:

a processing system; and memory coupled to the processing system, the memory comprising computer executable instructions that, when executed, perform operations comprising:

receiving, in a one-way transfer (OWT) system as part of a dataflow request, data associated with a dataflow identifier that indicates a use case and a destination for the data;

identifying a first set of policies to apply to the data based on the dataflow identifier by accessing a first data structure comprising a mapping of the dataflow identifier to the first set of policies and to a source identifier of a requestor of the dataflow request;

applying, by a policy engine of the OWT system, a first set of policies to the data based on the dataflow identifier;

creating a set of digital signatures for the first set of policies, wherein the set of digital signatures indicates that the policy engine successfully applied the first set of policies to the data;

evaluating the set of digital signatures using a security abstraction engine of the OWT system by comparing the set of digital signatures to an expected set of digital signatures;

in response to determining the set of digital signatures is valid, applying, by the security abstraction engine, a second set of policies to the data based on a type of the data, wherein the security abstraction engine comprises a policy enforcement component for processing the type of the data; and providing the data to the destination based on the dataflow identifier by accessing a second data structure comprising a mapping of the dataflow identifier to a destination identifier of a recipient of the data.

20. The device of claim 19, wherein:

the data is received, from a first computing environment, by a second computing environment of the device;

the first set of policies represents security controls abstracted from the first computing environment; and the second set of policies represents security controls of the second computing environment.

* * * * *